United States Patent
Hanelt et al.

(10) Patent No.: US 11,462,734 B2
(45) Date of Patent: Oct. 4, 2022

(54) METHOD FOR GRINDING SILICON-CONTAINING SOLIDS

(71) Applicant: WACKER CHEMIE AG, Munich (DE)

(72) Inventors: Eckhard Hanelt, Geltendorf (DE); Michael Fricke, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 593 days.

(21) Appl. No.: 16/347,805

(22) PCT Filed: Nov. 7, 2016

(86) PCT No.: PCT/EP2016/076853
§ 371 (c)(1),
(2) Date: May 6, 2019

(87) PCT Pub. No.: WO2018/082794
PCT Pub. Date: May 11, 2018

(65) Prior Publication Data
US 2019/0296341 A1    Sep. 26, 2019

(51) Int. Cl.
*H01M 4/38* (2006.01)
*C01B 33/02* (2006.01)
*H01M 4/58* (2010.01)
*C09C 1/28* (2006.01)
*B01J 2/16* (2006.01)
*H01M 4/02* (2006.01)
*H01M 4/134* (2010.01)

(52) U.S. Cl.
CPC .......... *H01M 4/386* (2013.01); *C01B 33/02* (2013.01); *C09C 1/28* (2013.01); *H01M 4/58* (2013.01); *B01J 2/16* (2013.01); *C01P 2004/32* (2013.01); *C01P 2004/52* (2013.01); *C01P 2004/61* (2013.01); *C01P 2004/62* (2013.01); *C01P 2006/12* (2013.01); *C01P 2006/40* (2013.01); *H01M 4/134* (2013.01); *H01M 2004/027* (2013.01)

(58) Field of Classification Search
CPC ........ H01M 10/0525; C01B 33/02; B01J 2/16
See application file for complete search history.

(56) References Cited

U.S. PATENT DOCUMENTS

| 5,346,141 | A | 9/1994 | Kim et al. |
| 7,490,785 | B2 | 2/2009 | Weidhaus |
| 7,850,102 | B2 | 12/2010 | Meier et al. |
| 9,073,038 | B2 | 7/2015 | Carr et al. |
| 2007/0040056 | A1 | 2/2007 | Weidhaus |
| 2008/0054106 | A1 | 3/2008 | Zehavi et al. |
| 2009/0294557 | A1 | 12/2009 | Nied et al. |
| 2011/0073689 | A1 | 3/2011 | Paulat et al. |
| 2016/0126538 | A1* | 5/2016 | Hanelt ............ H01M 10/0525 429/213 |
| 2016/0164085 | A1 | 6/2016 | Hanelt |
| 2018/0212234 | A1 | 7/2018 | Haufe |

FOREIGN PATENT DOCUMENTS

| DE | 102015215415 | A1 | 2/2017 |
| EP | 538611 | B1 | 3/1996 |
| EP | 1102340 | B1 | 9/2008 |
| EP | 1754539 | B1 | 9/2008 |
| EP | 3027690 | B1 | 6/2017 |
| GB | 1326965 | A | 8/1973 |
| JP | 2011065796 | A | 3/2011 |
| JP | 2013206535 | A | 10/2013 |
| KR | 940006017 | B1 | 7/1994 |
| KR | 101503936 | B1 | 3/2015 |
| WO | 0033976 | A1 | 6/2000 |
| WO | 07131502 | A1 | 11/2007 |
| WO | 09125370 | A1 | 10/2009 |
| WO | 2014081817 | A2 | 5/2014 |

OTHER PUBLICATIONS

English abstract for EP 538611 B1.
English abstract for JP 2013206535 A.
English abstract for JP 2011065796 A.

* cited by examiner

*Primary Examiner* — Khanh T Nguyen
(74) *Attorney, Agent, or Firm* — Brooks Kushman P.C.

(57) ABSTRACT

The invention relates to methods for producing silicon particles by grinding silicon-containing solids, wherein one or more gases are used, which contain reactive gas at a partial pressure of ≥0.3 bar, wherein reactive gases are selected from the group comprising oxygen, ozone, inorganic peroxides, carbon monoxide, carbon dioxide, ammonia, nitrogen oxides, hydrogen cyanide, hydrogen sulfide, sulfur dioxide, and volatile organic compounds.

4 Claims, No Drawings

METHOD FOR GRINDING SILICON-CONTAINING SOLIDS

CROSS-REFERENCE TO RELATED APPLICATIONS

This application is a U.S. National Phase Application of PCT/EP2016/076853, filed Nov. 7, 2016 the contents of which are incorporated herein by reference in its entirety for all purposes.

FIELD OF THE INVENTION

The invention relates to processes for milling silicon-containing solids.

BACKGROUND OF THE INVENTION

In many applications, there is a need for silicon particles having particle diameters in the micron range, as for example when silicon particles are used as active material in negative electrodes of lithium-ion batteries. One way of producing such particles goes via the comminution of larger silicon particles, for example by milling. To produce silicon powders having average particle sizes of, for example, 0.02 to 10 µm, use is frequently made of wet milling processes, as known from EP3027690. In wet milling processes, the material being milled is suspended in a milling liquid. Milling liquids, such as alcohols, can react with the silicon surfaces with liberation of hydrogen. After wet milling, drying and thus an additional process step is necessary to produce dry powders. A disadvantage is that drying of the milling suspensions can entail agglomeration of silicon particles. Subsequent deagglomeration makes yet another process step necessary, especially in the case of the use of the silicon particles in electrode inks for lithium-ion batteries, where importance is placed on homogeneous and narrow particle size distributions.

EP1102340 describes the milling of silicon particles in a bowl-mill roller crusher at a low oxygen partial pressure of 10 Pa to 20000 Pa, with the objective of obtaining silicon particles having an extremely thin oxide layer on the surface. The partial pressure of oxygen in air under standard conditions is in the region of 21230 pascals or 0.212 bar.

A major source of hazard posed to the production and handling of dry powders composed of small silicon particles is that of dust explosions. This is because silicon particles are rapidly oxidized on their surface by oxygen, air for example, or by other reactive oases in an exothermic reaction, and in the case of small silicon particles this may easily result in a dust explosion. In the course of the milling operation, silicon particles become increasingly smaller and at the same time the specific surface area of the particles becomes increasingly larger, and so the space for oxidation on the surface of the silicon particles increases and the risk of dust explosions climbs. This is true all the more if the particles are subject to elevated temperatures or elevated pressures.

In EP1102340, accordingly, low oxygen partial pressures are recommended for the milling of silicon. Furthermore, EP1102340 implies mild milling conditions, such as room temperature and ambient pressure.

US2008/0054106 advises carrying out the milling of silicon using nitrogen as milling gas. US2008/0054106 emphasizes that the milling gas must be dry and must not be reactive with silicon. In this context, US2008/0054106 places utmost value on the exclusion, for example, of oxygen, water, hydrogen, carbon monoxide or carbon dioxide from the milling gas. US2008/0054105 implies room temperature as the milling temperature. EP1754539 produces silicon particles with an average diameter of 50 to 1000 µm by milling. For lithium-ion batteries, however, silicon particles having average particle sizes of in general less than 10 µm are required. The milling of EP1754539 takes place in a fluidized-bed jet mill, and nitrogen, argon or, among others, purified air may be used as a stream of milling gas. The oxygen partial pressure of the purified air is not mentioned.

A further challenge is posed by the processing of the milled silicon particles in anode inks for producing anode coatings for lithium-ion batteries. In anode inks, the individual constituents of the anode material are in dispersion in a solvent. On the industrial scale, water is the favored solvent, for reasons of economics and environment. The surface of silicon, however, is highly reactive toward water, and on water contact it is oxidized, with formation of silicon oxides and hydrogen. The liberation of hydrogen leads to considerable difficulties in the processing of the anode inks. As a result of gas bubble inclusions, for example, such inks may produce uneven electrode coatings. Furthermore, the formation of hydrogen necessitates costly and inconvenient safety measures for protection. Any unwanted oxidation of silicon ultimately also leads to a reduction in the proportion of elemental silicon in the anode, which diminishes the capacity of the lithium-ion battery. A further objective, therefore, is also to passivate the silicon particles in the course of milling in such a way as to heighten their stability in aqueous anode inks.

BRIEF SUMMARY OF THE INVENTION

The object for the present invention, then, was to provide processes for milling silicon-containing solids that allow the aforesaid disadvantages to be avoided as far as possible and that also provide access to silicon particles having small average, particle sizes. In particular, the intention was to prevent dust explosions during the milling of silicon. As far as possible, it was also intended that the stability of the silicon particles in aqueous anode for lithium-ion batteries should be improved.

DETAILED DESCRIPTION OF PREFERRED EMBODIMENTS

Surprisingly this object has been achieved by milling silicon-containing solids using one or more gases (milling gas) which comprise reactive gas having a partial pressure of ≥0.3 bar, where reactive gases are selected from the group encompassing oxygen, ozone, inorganic peroxides, carbon monoxide, carbon dioxide, ammonia, nitrogen oxides, hydrogen cyanide, hydrogen sulfide, sulfur dioxide, and volatile organic compounds, such as, for example, organic peroxides, epoxides, alkenes, alkynes, alcohols, ethers, aldehydes, ketones, carboxylic acids, esters, amines, amides, nitriles, alkyl halides, aryl halides, aliphatic or aromatic hydrocarbons.

The milling of inorganic solids in air, including at elevated temperatures or pressures, is known from WO2007/131502, for example. The only material for milling that is stated in WO2007/131502, however, is amorphous $SiO_2$, such as silica, silica gel or silicates, but silicon is not stated.

A particular aspect associated with the milling of silicon-containing solids is that new, active silicon surfaces having open chemical bonds, which are highly reactive toward reactive gases, are continually formed. Such reactions are exothermic and can take an explosive course. For this reason, in the milling to date of silicon-containing solids, care has been taken to ensure that reactive gases, such as oxygen, carbon monoxide or carbon dioxide, are excluded entirely or are present at most to a small extent during milling, or that the milling was carried out under mild conditions, as described in EP1754539 or EP3027690, for example. Against this background, the fear was that the milling of the silicon-containing solids in accordance with the invention would proceed so vigorously that a dust explosion would occur or that the silicon would be consumed by reaction with reactive gases to such an extent as to make the resultant silicon particles no longer suitable for corresponding applications, such as lithium-ion batteries. Surprisingly, with the process of the invention, these problems do not occur, or at least not in such a way as to be a hindrance.

Much employed for the coating of silicon are CVD processes (chemical vapor deposition), such as in WO2014/081817, for example. EP0538611 as well describes the coating of silicon wafers with silicon carbide by a CVD process using ethylene. Employed generally for this purpose are silicon particles which contain no active metal surfaces. For attaching organic molecules to silicon particles, WO00/33976 advises first halogenating the silicon particles and then reacting them with a nucleophile. Advantageously, in accordance with the invention, the surfaces of the silicon particles can be coated by means of the reactive gases during the milling procedure itself.

The subject matter of the invention are processes for producing silicon particles by milling silicon-containing solids using one or more gases (milling gas) which comprise reactive gas having a partial pressure of ≥0.3 bar, where reactive gases are selected from the group encompassing oxygen, ozone, inorganic peroxides, carbon monoxide, carbon dioxide, ammonia, nitrogen oxides, hydrogen cyanide, hydrogen sulfide, sulfur dioxide, and volatile organic compounds.

The silicon-containing solids used in the process of the invention are also referred to below for short as reactant Si. The silicon particles produced in accordance with the invention are also referred to for short as product Si particles.

The milling gas comprises the reactive gas having a partial pressure of preferably 0.3 to 200 bar, more preferably 0.4 to 100 bar, very preferably 0.4 to 20 bar, even more preferably 0.5 to 10 bar, and most preferably 0.6 to 4 bar.

The reactive gas has a temperature of preferably ≥50° C., more preferably 80 to 800° C., even more preferably 100 to 600° C., and most preferably 150 to 400° C.

The milling gas has a pressure of preferably 1 to 200 bar, more preferably of 1.1 to 40 bar, even more preferably 1.5 to 20 bar, and most preferably 2 to 10 bar.

In preferred embodiments of the process of the invention it is also possible, advantageously, to adjust the pressure and/or the temperature by compressing the reactive gas with only one compressor stage and to use the reactive gas thus compressed, without cooling, in the process of the invention. This leads to a greater process efficiency by comparison, for example, with conventional jet mill processes typically requiring two compressor stages and, moreover, cooling of the milling gas.

The milling gas contains preferably 1 to 100 vol %, more preferably 5 to 80 vol %, and even more preferably 10 to 50 vol % of reactive gases. The milling gas comprises nitrogen, noble gases or other inert gases at preferably ≤99 vol %, more preferably 20 to 95 vol %, and most preferably 50 to 90 vol %.

Water, more particularly in the form of steam, is present in the milling gas at preferably ≤10 vol %, more preferably ≤5 vol %, and most preferably ≤1 vol %. Other impurities or other gaseous components are present in the milling gas at preferably ≤10 vol %, more preferably ≤5 vol %, and most preferably ≤1 vol %. The figures vol % are based in each case on the overall volume of e milling gas. The aforesaid components and also the figures in vol % for various components are disclosed in each case both independently of one another and in combination.

An oxygen-containing milling gas most preferably comprises air as reactive gas, more particularly ambient air, at a pressure of ≥1.5 bar, for example. Ambient air is preferably used without purification. Nevertheless, the ambient air used may alternatively have been freed from particles, for example, by means of a particle filtration system, for example.

The reactive gases are selected from the group encompassing oxygen, ozone, inorganic peroxides, carbon monoxide, carbon dioxide, ammonia, nitrogen oxides, hydrogen cyanide, hydrogen sulfide, sulfur dioxide, and volatile organic compounds.

The reactive gases have a boiling point, at a pressure of 1 bar, of preferably ≤300° C., more preferably ≤200° C., and very preferably ≤100° C. Compounds having such boiling points are also referred to as volatile compounds.

An inorganic peroxide is, for example, hydrogen peroxide. Examples of nitrogen oxides are dinitrogen monoxide, nitrogen monoxide, nitrogen dioxide, and dinitrogen tetroxide.

The volatile organic compounds contain preferably 1 to 16 carbon atoms, more preferably 1 to 8 carbon atoms, and most preferably 1 to 4 carbon atoms. The volatile organic compounds may be branched or unbranched, linear or cyclic, or substituted or unsubstituted.

The volatile organic compounds may for example be organic peroxides, epoxides, alkenes, alkynes, alcohols, ethers, aldehydes, ketones, carboxylic acids, esters, amines, amides, nitriles, alkyl halides, aryl halides, aliphatic or aromatic hydrocarbons.

Examples of organic peroxides are tert-butyl peroxide, tert-butyl hydroperoxide, text-butyl peroxopivalate, and cumene hydroperoxide. Examples of epoxides are ethylene oxide and propylene oxide. Examples of alkenes are ethene, propene, butene, pentene, hexene, octene, butadiene, pentadiene, methylbutadiene, hexadiene, heptatriene, cyclohexene, cyclooctene, cyclobutadiene, cyclopentadiene, dicyclopentadiene, cyclooctadiene, cycloheptatriene, norbornene, and norbornadiene. Examples of alkynes are ethyne, propyne, butyne, pentyne, hexyne, heptyne, and octyne. Examples of alcohols are methanol, ethanol, propanol, isopropanol, butanol, pentanol, hexanol, octanol, cyclopropanol, propenol, allyl alcohol, propargyl alcohol, benzyl alcohol, phenol, cresol, dihydroxybenzene, and ethylene glycol. Examples of ethers are diethyl ether, ethyl pentyl ether, tert-butyl methyl ether, dimethoxyethane, tetrahydrofuran, dioxane, and anisole. Examples of aldehydes are formaldehyde, acetaldehyde, propanal, butanal, pentanal, hexanal, glyoxal, furfural, benzaldehyde. Examples of ketones are acetone, ethyl methyl ketone, pinacolone, cyclopentanone, acetylacetone, acetophenone, cyclohexanone. Examples of carboxylic acids are, methanoic acid, ethanoic acid, propanoic acid, butanoic acid, pentanoic acid, hexanoic acid, acrylic acid, crotonic acid, acetylene dicarboxylic acid, lactic acid, maleic acid, benzoic acid, phenylacetic acid, phthalic acid, and terephthalic acid. Examples of esters are methyl formate, ethyl formate, methyl acetate, ethyl acetate. Examples of amines are methylamine, ethylamine, propylamine, dimethylamine, diethylamine, trimethylamine, triethylamine, ethyldiisopropylamine, pyrrole, pyrazole, pyrrolidine, piperidine, morpholine, N-methylmorpholine, picoline, pyrimidine, aniline. Examples of amides are formamide, dimethylformamide, and acetamide.

Examples of nitriles are acetonitrile, propionitrile, butyronitrile, acrylonitrile, and benzonitrile. Examples of alkyl halides are methyl chloride, ethyl chloride, propyl chloride, bromomethane, bromoethane, bromopropane, iodomethane, iodoethane, lodopropane, dichloromethane, dibromomethane, diiodomethane, chloroform, bromoform, iodoform, carbon tetrachloride, and benzyl chloride. Examples of aryl halides are chlorobenzene, bromobenzene, iodobenzene, dichlorobenzene, and trichlorobenzene. Examples of aliphatic hydrocarbons are methane, ethane, propane, propylene, butane, butene, pentane, isobutane, hexane. Examples of aromatic hydrocarbons are benzene, toluene, styrene, ethylbenzene, and diphenylmethane; further aromatic hydrocarbons are nitrobenzene, pyridine.

The most preferred reactive gas is oxygen, more particularly as a constituent of air.

The milling may be carried out in commonplace mills, such as, for example, in jet mills, ball mills or hammer mills. Jet mills are preferred.

Mills generally encompass a milling chamber having one or more inlet openings for the milling gas (milling gas inlet), especially in the form of nozzles, and optionally one or more further devices, such as one or more classifiers.

Classifiers may be installed as a separate unit downstream of the mills. Classifiers are preferably integrated into the mills, generally located spatially downstream of the milling chamber. Classifiers are useful for obtaining fine particles or particles having a narrow particle size distribution.

Preferred jet mills are opposed-jet mills or spiral jet mills. Particular preference is given to dense-bed jet mills, spiral jet mills, and essentially fluidized-bed opposed-jet mills.

Fluidized-bed opposed-jet mills contain, preferably in the lower third of the milling chamber, two or more inlets for the milling gas, preferably in the form of nozzles, which are preferably located in a horizontal plane. The milling jet inlets are particularly preferably arranged around the circumference of the preferably round milling chamber in such a way that the milling jets all meet at a point in the interior of the milling chamber. The milling jet inlets are especially preferably distributed uniformly around the circumference of the milling chamber. In the case of three milling jet inlets, the spacing is preferably in each case 120°.

The mills can be constructed in a conventional way from materials which are customary for this purpose. The mills or parts of the mills, in particular the milling space, are preferably made of silicon or wear-resistant ceramic, such as zirconium oxide, silicon nitride or silicon carbide, or are lined therewith. Such ceramics are particularly wear-resistant. These measures are suitable for avoiding or at least reducing contamination of the material being milled with foreign substances as a result of contact with the walls of the mill.

The individual parts of the mills that come into contact with the reactive gases, especially the milling space, are held preferably under conditions, such as the temperature or pressure, under which there is at least very largely, preferably completely, no condensing-out of the reactive gases.

Unless otherwise detailed, the milling may be carried out in an inherently conventional way. Accordingly the silicon-containing solids may be introduced as usual into the milling chamber of the mill. The reactive gas is supplied to the milling chamber generally through one or more milling gas inlets, preferably in the form of nozzles. Located in the milling space of the mills, generally, are reactive gases or milling gas.

In the case of jet mills, the reactive gas is supplied to the milling chamber generally through nozzles. Within the milling chamber there are generally one or more milling gas streams (milling jets). In jet mills, the silicon-containing solids for milling are generally carried by milling jets in the milling chamber and customarily accelerated to high velocities. The milling of the solids here takes place generally by collision of different particulate solids, or else by particulate solids striking the wall of the milling chamber and being comminuted in the process.

The process of the invention is generally a dry milling process. The milling may therefore be carried out in the absence of solvents, more particularly in the absence of liquids. In general, therefore, the milling does not take place in dispersion, as is typical for wet milling processes for silicon.

Operating conditions or precautions for protection from explosion may be taken by the skilled person from the present disclosure. Any further measures are familiar to the skilled person.

The above details or parameters concerning the reactive gases or the milling gas are based preferably on reactive gases or milling gas as they are introduced into the mill, more particularly into the milling chamber of the mill, or as they are present in the milling chamber, more particularly of ball mills or hammer mills. Preferably during flow passage through the milling gas inlet, more particularly during flow passage through the milling gas inlet in the form of nozzles of the jet mills, or on entry into the milling chamber, the aforementioned details are met by the reactive gases or by the milling gas. The reactive gases or the milling gas may fulfill the parameters or provisos of the in throughout the implementation of the process, or only at times. During start-up or run-down of the mill, for example, different conditions may be chosen. It is also possible for there to be deviation at times, during the implementation of the process, from the parameters or provisos of the invention. Preferably, however, the parameters or provisos of the invention are observed while the essential part or the whole part of the reactant Si particles are being milled.

The particle sire distribution of the silicon particles produced in accordance with the invention and also of the silicon-containing solids (starting material) is determined in accordance with the invention by ISO 13320 by means of static laser scattering Horiba LA 950 instrument. The samples are measured wet in isopropanol. During preparation of the samples, particular attention is paid to dispersing the particles in the measurement solution, in order to measure the size not of agglomerates but rather of individual particles. For this purpose, highly diluted suspensions (0.2 to 2 wt % solids content) of the silicon particles in isopropanol were prepared, and prior to the measurement were treated with ultrasound for 30 minutes (for example, in a Hielscher UIS250v laboratory ultrasound instrument with LS24d5 sonotrode, 120 W power, 50% pulsing).

The particle size distributions are characterized by the values $d_{10}$, $d_{50}$ or $d_{90}$, which represent the 10%, 50% and 90%, respectively, percentile values of the volume-weighted diameter size distributions of the particles.

The reactant Si has a volume-weighted particle size distribution having a $d_{90}$ of preferably ≤10 mm, particularly preferably $d_{90}$≤5 mm and very particularly preferably $d_{90}$≤2 mm.

The median $d_{50}$ of the volume-weighted diameter size distribution of the product Si particles is in the range of preferably 0.3 µm to 1 mm, particularly preferably 0.5 µm to 200 µm, even more preferably 1 µm to 100 µm and most preferably 2 µm to 50 µm.

The $d_{10}$ of the product Si particles is in the range of preferably 0.1 µm to 200 µm, particularly preferably 0.2 µm to 50 µm and most preferably 0.4 µm to 10 µm.

The $d_{90}$ of the product Si particles is in the range of preferably 1 µm to 2 mm, particularly preferably 2 µm to 500 µm and most preferably 4 µm to 100 µm.

The relative breadth of the volume-weighted size distribution $(d_{90}-d_{10})/d_{50}$ of the product Si particles is preferably ≤3 and particularly preferably ≤2.

The product Si particles have fracture surfaces which can have sharp edges. They are typically splinter-shaped.

One possibility for characterizing the particle shape is the sphericity. According to the definition of Wadell, the sphericity $\psi$ is the ratio of the surface area of a sphere of the same volume to the actual surface area of a body. In the case of a sphere, $\psi$ has the value 1. According to this definition, the product Si particles have a sphericity of preferably $0.3<\psi<0.9$ and particularly preferably $0.5<\psi<0.9$.

According to an alternative definition, the sphericity S is the ratio of the circle-equivalent diameter of the projected area A of a particle onto a plane to the corresponding diameter from the circumference U of this projection: $S=2\sqrt{\pi A}/U$. In the case of an ideal circle, S has the value 1. For the product Si particles, the sphericity S is in the range of preferably 0.5 to 0.9. The measurement of the sphericity S is carried out by graphical evaluation of optical micrographs of individual particles or, in the case of particles <10 µm, scanning electron micrographs.

The international standard of the "Federation Europeenne de la Manutention" gives, in FEM 2.581, an overview of the aspects under which a bulk material is to be examined. The standard FEM 2.582 defines the general and specific bulk material properties in respect of the classification. Characteristic values which describe the consistency and the state of the material are, for example, particle shape and particle size distribution (FEM 2.581/FEM 2.582: General characteristics of bulk products with regard to their classification and their symbolization). According to DIN ISO 3435, bulk materials can be subdivided into 6 different particle shapes as a function of the nature of the particle edges:

I: sharp edges having approximately equal extents in the three dimensions (for example: cube);
II: sharp edges of which one is significantly longer than the other two (for example: prism, blade);
III: sharp edges of which one is significantly smaller than the other two (for example: plate, flakes);
IV: round edges having approximately equal extents in the three dimensions (for example: sphere);
V: round edges, significantly greater in one direction than in the other two (for example: cylinder, rod);
VI: fibrous, thread-like, lock-like, entangled.

According to this classification of bulk materials, the product Si particles are preferably particles of the particle shapes I, II or III.

The following information with regard to the physical composition relates, unless indicated otherwise, both to the product Si particles produced according to the invention and also to the reactant Si.

For the purposes of this invention, silicon is generally a solid comprising phases of elemental silicon.

Preference is given to elemental silicon. This is because elemental silicon is particularly advantageous for processes for producing anode materials containing silicon particles for lithium-ion batteries. Such silicon has the greatest storage capacity for lithium ions.

Elemental silicon is to be understood as high-purity polysilicon having a small proportion of foreign atoms (for example B, P, As), deliberately doped silicon or else metallurgical silicon which can have a specified amount of elemental impurities (for example Fe, Al, Ca).

The silicon can also contain silicon oxide or a binary, ternary or multinary silicon-metal alloy (containing, for example, Sn, Ca, Co, Ni, Cu, Cr, Ti, Al, Fe).

The metallic or elemental impurities in the silicon preferably amount to ≤5 wt %, particularly preferably ≤2 wt % and very particularly preferably ≤1 wt %.

The surface of the product Si particles may possibly be hidden by an oxide layer or by other inorganic or by organic groups, as for example S—OH or Si—H groups or groups attached covalently via Si—C, Si—O, Si—N or Si—S bonds. In particular, there may be reactive gases attached to the surface of the product Si particles via Si—C, Si—O, Si—N or Si—S bonds. During milling, the volatile organic compounds may also be carbonized. Also obtainable in accordance with the invention, therefore, are carbon-coated product Si particles.

By the process of the invention, product Si particles are obtainable which on the surface carry a coating based on one or more reactive gases with a layer thickness of preferably ≥3 cm, more preferably 3 to 100 nm, very preferably 4 to 40 nm, and most preferably 5 to 20 nm (method of determination: see description of the examples).

The product Si particles contain preferably ≥0.001 wt %, more, preferably 0.01 to 20 wt %, even more preferably 0.1 to 10 wt %, and most preferably 0.1 to 5 wt % of carbon, nitrogen, sulfur or, in particular, oxygen, based on the total weight of the product Si particles.

If the product Si particles contain silicon oxide, then the stoichiometry of the oxide SiOx is preferably in the range $0<x<1.3$.

If the reactive gas comprises oxygen, the product Si particles, based on 1 $m^2$ particle surface area, have an oxygen content of preferably 5 to 50 mg, more preferably 6 to 40 mg, and most preferably 8 to 30 mg (method of determination: the oxygen content per unit particle surface area, in mg/$m^2$, is the ratio of the specific oxygen content per unit mass of silicon, which is measured using a Leco TCH 600 oxygen analyzer, to the particle surface area, which is calculated from the measured particle size distribution on the assumption of spherical particles, in $m^2$/g. This particle surface area is obtained directly in the case of measurement with a Horiba LA950).

A further subject of the invention are processes for producing aqueous ink formulations, characterized in that product Si particles and one or more binders are mixed with water.

Product Si particles produced in accordance with the invention may be used directly in anode inks for producing anode coatings for lithium-ion batteries. The production of the anode inks and their further processing into anode coatings and, finally, into lithium-ion batteries may take place in a way which is conventional per se, as described in DE-A 102015215415.7, for example.

A further subject of the invention is the use of the product Si particles produced in accordance with the invention for producing anodes for lithium-ion batteries.

Under the milling conditions according to the invention, surprisingly, there was no dust explosion. The milling of silicon with inventive use of the reactive gases is indeed accompanied by reaction of silicon on the surface of the silicon particles. Surprisingly, however, this reaction takes place only to a limited extent, and so a thin layer is formed only on the surface of the particles, and passivates the silicon, advantageously, with respect to a further reaction, and ultimately in this way preserves it from dust explosion.

As a result of the passivation, the silicon particles produced in accordance with the invention, during storage under standard conditions and also in aqueous anode ink formulations, are more stable than conventionally produced silicon particles.

Through the inventive milling using reactive gases it is possible to overcome the disadvantages of wet milling processes. In accordance with the invention, therefore, the silicon particles can be obtained directly in the form of powders without any need for additional process steps for the drying or deagglomeration of the silicon particles. Moreover, silicon particles having very small average particle diameters can be obtained.

The silicon particles produced in accordance with the invention can advantageously be used directly as starter material for an anode active material of lithium-ion batteries, without any need for a further process step for treating the milled silicon products.

The invention is elucidated by means of the following examples:

Determination of the average thickness $d_{SiO2}$ the oxide layer: The thickness of the oxide layer on the surface of the milled silicon particles is determined using the following equation:

$$d_{SiO2} = 0.3 \cdot \psi \cdot m_0 \cdot d_{50}$$

$d_{50}$: median of the particle size distribution of the Si particles; $\psi$: sphericity of the Si particles; $m_0$: weight fraction of oxygen in the Si particles).

In the case of comparative example 3, after milling in a nitrogen atmosphere and subsequent storage in air, and according to this formula with $d_{50}$=4.8 μm, $m_0$=0.27% and $\psi$=0.5, an average oxide layer thickness of 2 nm is obtained. This is a figure known from the literature for the spontaneous oxidation of silicon surfaces on storage in air under standard conditions.

In examples 1a, 1b and 2, according to the formula above, oxide layers with a thickness of 3 nm and 4 nm, respectively, were obtained, resulting in significantly better passivation than in comparative example 3.

Example 1a 5 kg of ultra-high-purity polycrystalline silicon powder from solar silicon (Wacker BGF (sg) type PCL-NCS-F, $d_{10}$=100 μm, $d_{50}$=240 μm, $d_{90}$=440 μm) were introduced into the reservoir of a fluidized-bed jet mill CGS 16 (manufacturer: Netzsch Trockenmahltechnik GmbH). The mill was operated with 48 m³/h air at 20° C. and 7 bar gauge pressure (oxygen partial pressure: 1.7 bar). The speed of the classifier wheel was 3000 rpm. After 150 min, the mill was stopped and the collection vessel on the particle filter was opened. It contained 2.1 kg of silicon powder of $d_{10}$=2.5 μm, $d_{50}$=4.5 μm and $d_{90}$=7.3 μm (measurement in the Horiba LA950). The surface area, calculated from the particle size distribution on the assumption of spherical particles, was 0.67 m²/g. The particles were stored in air at room temperature under ambient pressure. The oxygen content determined thereafter with a Leco TCH 600 oxygen analyzer was 0.43 wt % or 6.5 mg/m² based on the calculated particle surface area.

Example 1b

In a milling process as in example 1a, the speed of the classifier wheel was increased to 8000 rpm. After 190 min, the mill was stopped and the collection vessel on the particle filter was opened. It contained 450 g of silicon powder of $d_{10}$=1.1 μm, $d_{50}$=2.7 μm and $d_{90}$=4.9 μm (measurement in the Horiba LA950). The surface area, calculated from the particle size distribution on the assumption of spherical particles, was 1.38 m²/g. The particles were stored in air at room temperature under ambient pressure. The oxygen content determined thereafter with a Leco TCH 600 oxygen analyzer was 1.02 wt % or 7.4 mg/m² based on the calculated particle surface area.

Example 2

5 kg of ultra-high-purity polycrystalline silicon powder from solar silicon (Wacker BGF (sg) type PCL-NCS-F, $d_{10}$=100 μm, $d_{50}$=240 μm, $d_{90}$=440 μm) were introduced into the reservoir of a fluidized-bed jet mill CGS 16 (manufacturer: Netzsch Trockenmahltechnik GmbH). The mill was operated with 97 m³/h air at 203° C. and 3.2 bar gauge pressure (oxygen partial pressure: 0.9 bar). The speed of the classifier wheel was 8000 rpm. After 60 min, the mill was stopped and the collection vessel on the particle filter was opened. It contained 270 g of silicon powder of $d_{10}$=1.3 μm, $d_{50}$=2.9 μm and $d_{90}$=5.0 μm (measurement in the Horiba LA950). The surface area, calculated from the particle size distribution on the assumption of spherical particles, was 1.2 m²/g. The particles were stored in air at room temperature under ambient pressure. The oxygen content determined thereafter with a Leco TCH 600 oxygen analyzer was 1.03 wt % or 8.6 mg/m² based on the calculated particle surface area.

Comparative Example 3

5 kg of ultra-high-purity polycrystalline silicon powder from solar silicon (Wacker BGF (sg) type PCL-NCS-F, $d_{10}$=100 μm, $d_{50}$=240 μm, $d_{90}$=440 μm) were introduced into the reservoir of a fluidized-bed jet mill CGS 16 (manufacturer: Netzsch Trockenmahltechnik GmbH). The mill was operated with 93 m³/h nitrogen at 20° C. and 7 bar gauge pressure. The speed of the classifier wheel was 6000 rpm. After 60 min, the mill was stopped and the collection vessel on the particle filter was opened. It contained 3.4 kg of silicon powder of $d_{10}$=3.1 μm, $d_{50}$=4.8 μm and $d_{90}$=7.1 μm (measurement in the Horiba LA950). The surface area, calculated from the particle size distribution on the assumption of spherical particles, was 0.57 m²/g. The particles were stored in air at room temperature under ambient pressure. The oxygen content determined thereafter with a Leco TCH 600 oxygen analyzer was 0.27 wt % or 4.7 mg/m² based on the calculated particle surface area.

The invention claimed is:
1. A method for producing silicon particles, comprising:
  milling silicon-containing solids which comprise phases of elemental silicon in a jet mill using one or more gases which include reactive gas having a partial pressure of from 0.3 bar to 200 bar, and recovering milled silicon particles, wherein the reactive gas is selected from the group consisting of oxygen, ozone, inorganic peroxides, carbon monoxide, carbon dioxide, ammonia, nitrogen oxides, hydrogen cyanide, hydrogen sulfide, sulfur dioxide, and volatile organic compounds containing 1 to 4 carbon atoms, and wherein the reactive gas has a temperature of from 50° C. to 800° C.

2. The method of claim 1, wherein the silicon comprises metallurgical silicon, with up to 5 wt. % of impurities.

3. The method of claim 1, wherein the milled silicon particles have a surface coating, due to reaction with the reactive gas, with a layer thickness of from 3 nm to 100 nm.

4. The method of claim 1, wherein the milled silicon particles have an oxygen content of 5 mg to 50 mg, calculated as for milled particles with a surface area of 1 $m^2$.

* * * * *